(12) United States Patent  
Ralston et al.

(10) Patent No.: US 8,078,703 B2  
(45) Date of Patent: Dec. 13, 2011

(54) EFFICIENT SOFTWARE DOWNLOAD TO CONFIGURABLE COMMUNICATION DEVICE

(75) Inventors: John D. Ralston, Portola Valley, CA (US); Ravi Subramanian, Mountain View, CA (US); Song Chen, San Jose, CA (US); Ted E. Williams, Los Gatos, CA (US)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 12/908,613

(22) Filed: Oct. 20, 2010

(65) Prior Publication Data

US 2011/0035475 A1 Feb. 10, 2011

Related U.S. Application Data

(60) Division of application No. 11/675,313, filed on Feb. 15, 2007, now Pat. No. 7,870,233, which is a continuation of application No. 09/928,273, filed on Aug. 9, 2001, now Pat. No. 7,188,159.

(51) Int. Cl.
*G06F 15/177* (2006.01)
*H04L 27/06* (2006.01)
*H04M 3/00* (2006.01)

(52) U.S. Cl. ......... 709/220; 709/221; 375/340; 455/418

(58) Field of Classification Search .......... 709/220–222; 455/418, 420; 375/324, 340

See application file for complete search history.

(56) References Cited

U.S. PATENT DOCUMENTS

| | | | |
|---|---|---|---|
| 5,838,907 A | 11/1998 | Hansen | |
| 5,867,713 A | 2/1999 | Shrader et al. | |
| 5,974,322 A | 10/1999 | Carlsson et al. | |
| 6,097,950 A | 8/2000 | Bertacchi et al. | |
| 6,161,133 A | 12/2000 | Kikinis | |
| 6,167,445 A | 12/2000 | Gai et al. | |
| 6,188,898 B1 * | 2/2001 | Phillips | 455/433 |
| 6,223,222 B1 | 4/2001 | Fijolek et al. | |
| 6,263,382 B1 | 7/2001 | Bartlett et al. | |
| 6,282,575 B1 | 8/2001 | Lin et al. | |
| 6,286,038 B1 | 9/2001 | Reichmeyer et al. | |
| 6,411,603 B1 | 6/2002 | Ahuja et al. | |
| 6,519,570 B1 | 2/2003 | Faber et al. | |
| 6,570,910 B1 * | 5/2003 | Bottomley et al. | 375/148 |
| 6,651,155 B1 | 11/2003 | Bocchino et al. | |
| 6,684,241 B1 | 1/2004 | Sandick et al. | |
| 6,775,267 B1 | 8/2004 | Kung et al. | |
| 6,807,155 B1 * | 10/2004 | Subramanian | 370/252 |
| 6,980,527 B1 * | 12/2005 | Liu et al. | 370/280 |
| 7,230,978 B2 | 6/2007 | Bitterlich et al. | 375/219 |

OTHER PUBLICATIONS

Xipeng et al., "Internet QoS: the Big Picture", IEEE Network (Mar. 1999). Chatzaki et al., "Multilevel QoS-policy-based routing management architecture appropriate for heterogeneous network environments", Proc. SPIE, vol. 3408, pp. 128-138 (Sep. 1998).
U.S. Appl. No. 09/565,654, Subramanian, "Method of Profiling Disparate Communications and Signal Processing Standards and Services", filed May 5, 2000.

* cited by examiner

*Primary Examiner* — Yemane Mesfin
(74) *Attorney, Agent, or Firm* — Laura C Brutman

(57) ABSTRACT

An efficient software download to a configurable communication device is disclosed herein. The method of efficiently downloading software begins with a step of receiving a request to configure a communication device to run a communication application. The communication device being configured has a plurality of function blocks with a fixed portion of hardware and a flexible portion of hardware, wherein the same plurality of function blocks is capable of operating a plurality of communication applications. In a next step, the capability of the fixed portion and the flexible portion of hardware of the communication device is evaluated for a capability of implementing the communication application. Next, configuration information only for the flexible portion of hardware of the communication device is transmitted to the communication device to enable it to operate the communication application. An identification of the communication application is also transmitted to the communication device for purposes of tracking its implementation.

8 Claims, 11 Drawing Sheets

400

| Hardware | Air Interface Change | QOS Option | Service Option |
|---|---|---|---|
| | Ex: IS-95 to IS-2000 | Ex: Antenna Diversity, Algorithmic enhancement | Ex: GPS |
| Filter | Qty, Connectivity Parameters | Parameters | n/a |
| Finger | Qty, Connectivity Parameters | Parameters | Qty, Connectivity Parameters |
| Combiner | Qty, Connectivity Parameters | n/a | Qty, Connectivity Parameters |
| Searcher | Qty, Connectivity Parameters | Parameters | Qty, Connectivity Parameters |
| Estimator | Qty, Connectivity Parameters | Parameters | Qty, Connectivity Parameters |
| Timing | Parameters | Parameters | Parameters |
| Codec | Connectivity Parameters | n/1 | Parameters |

FIGURE 4A

| Hardware | TDMA | | | | CDMA | | | | |
|---|---|---|---|---|---|---|---|---|---|
| | IS 136 | GSM | GPRS | EDGE | IS-95B | IS-2000 | WCDMA-FDD | GPS | Global star |
| Parameter Estimator Functions | | | | | | | | | |
| LMS Channel Estimator | | X | | | | | | | |
| Windowed Average Energy Estimator | X | X | X | X | X | X | X | | |
| ML Symbol Timing Estimator | X | X | X | X | X | X | X | X | X |
| ML Carrier Phase Estimator | X | X | X | X | X | X | X | X | X |
| PN Correlator | | | | | X | X | X | | |
| Matched Filter | | | | | | | X | X | |
| Interference Energy Estimator | | | | | | X | X | | |

EFFICIENT SOFTWARE DOWNLOAD TO CONFIGURABLE COMMUNICATION DEVICE

CROSS-REFERENCE TO RELATED APPLICATIONS

This application is a division of Ser. No. 11/675,313 filed Feb. 15, 2007, which is a continuation of Ser. No. 09/928,273 filed Aug. 9, 2001, which claims priority to the provisional patent application with [the following] Ser. No. 60/224,172 filed on Aug. 9, 2000.

Related applications, which are incorporated herein by reference, are:
A WIRELESS SPREAD SPECTRUM COMMUNICATION PLATFORM USING DYNAMICALLY RECONFIGURABLE LOGIC
Ser. No. 09/772,584, filed Jan. 29, 2001
A CONFIGURABLE ALL-DIGITAL COHERENT DEMODULATOR SYSTEM FOR SPREAD SPECTRUM APPLICATIONS
Ser. No. 09/751,783, filed Dec. 29, 2000
A CONFIGURABLE MULTIMODE DESPREADER FOR SPREAD SPECTRUM APPLICATIONS
Ser. No. 09/751,785, filed Dec. 29, 2000
DYNAMICALLY RECONFIGURABLE UNIVERSAL TRANSMITTER SYSTEM
Ser. No. 09/922,484, filed Aug. 3, 2001
IMPROVED APPARATUS AND METHOD FOR MULTI-THREADED SIGNAL PROCESSING
Ser. No. 09/492,634, filed on Jan. 27, 2000
METHOD AND APPARATUS FOR TIME-SLICED AND MULTI-THREADED Data PROCESSING IN A COMMUNICATION SYSTEM
Ser. No. 09/920,093, filed Jul. 31, 2001
A CONFIGURABLE CODE GENERATOR SYSTEM FOR SPREAD SPECTRUM APPLICATIONS
Ser. No. 09/751,782, filed Dec. 29, 2000
METHOD AND APPARATUS FOR PROCESSING A SECONDARY SYNCHRONIZATION CHANNEL IN A SPREAD SPECTRUM SYSTEM
Ser. No. 09/772,583, filed Jan. 29, 2001
METHOD OF PROFILING DISPARATE COMMUNICATIONS AND SIGNAL PROCESSING STANDARDS AND SERVICES
Ser. No. 09/565,654, filed May 5, 2000
METHOD OF GENERATING A CONFIGURATION FOR A CONFIGURABLE SPREAD SPECTRUM COMMUNICATION DEVICE
Ser. No. 09/772,582, filed Jan. 29, 2001.

TECHNICAL FIELD

The present invention relates generally to wireless communication systems. In particular, the present claimed invention relates to a method of configuring a reconfigurable communication device.

BACKGROUND ART

Existing communication devices are "static" devices. That is, they are designed to support a specific wireless communications standard and/or to support a data transmission at a specific data rate. Typically, different wireless communications standards are used in different wireless networks, both within a geographic locality and worldwide. Thus, an individual traveling between different regions is required to use a separate wireless communications device in each region.

In addition, data transmission at a variety of data rates often requires different devices. Thus, an individual who wants to switch the rate of data transmission is required to use a separate wireless communications device for different sets of data rates. In view of the foregoing, a need arises to overcome the limitations of a communication device with fixed data rates and fixed wireless communication standards.

Existing communication standards continue to evolve while new communication standards continue to arise. Both of which can translate into the demise of a given fixed ASIC communication device. Furthermore, new services are continuously being offered, e.g., GPS, map location and direction services, wideband data transmissions, etc. However, these new services typically require new functions in a communication device. For a legacy fixed-function ASIC device, the new services are unavailable. Thus, either a user is limited in the availability of services with a legacy communication device, or the communication device must be replaced every time a desired service or communication standard is developed. This can be costly and counterproductive in terms of infrastructure, design, and consumer resources. Consequently, a need arises for a communication device that can overcome the limitations of fixed application architecture.

If a communication device has a general-purpose microprocessor or a digital signal processor, then some changes to the software may be implemented over the life of the device. However, if the software programs are required to be downloaded for execution by the digital signal processor or processors in the device, then a significant amount of time can be consumed. This time duration can translate into user dissatisfaction, inability to modify the device within the allotted time, e.g., for a handoff situation, and an increase in errors over time due to channel degradation. Furthermore, the quantity and degree of functions that can be affected by a software download to a DSP might only be a fraction of the functions that need to be changed for a quality of service change, a new service, or a new communication protocol. Consequently, a need arises for a device and a method to overcome the limitation of a large and slow software download. Furthermore, a need arises to overcome the limitation of the narrow scope of the changes available from a software download to a DSP.

Given the high demand for a wide variety of services and communication applications, a shortage of resources sometimes exists within a given sector. If a system uses a first come first serve basis, then subsequent potential users are simply denied access. However, the need of a subsequent potential user for a communication application or of bandwidth for a base station may far exceed the need or urgency of an active user. Thus, a need exists to overcome the limitation of providing resources, and the configurations to use them, to users simply on a first come first serve basis.

SUMMARY OF THE INVENTION

The present invention overcomes the limitations of a communication device with fixed data rates and fixed wireless communication standards. The present invention also overcomes the limitations of a fixed application architecture for the communication device. Beneficially, the present invention provides an architecture and a method that overcomes the limitation of a large and slow software download. Furthermore, the present invention overcomes the limitation of the narrow scope of changes capable from a software download to a DSP. The present invention also overcomes the limitation of providing resources, and the configurations to use them, to users simply on a first come first serve basis.

A first embodiment of the present invention provides a method of efficiently downloading software to a configurable communication device. The method of efficiently downloading software begins with a step of receiving a request to configure a communication device to run a communication application. The communication device being configured has a plurality of function blocks with a fixed portion of hardware and a flexible portion of hardware, wherein the same plurality of function blocks is capable of operating a plurality of communication applications. In a next step, the capability of the fixed portion and the flexible portion of hardware of the communication device is evaluated for a capability of implementing the communication application. Next, configuration information only for the flexible portion of hardware of the communication device is transmitted to the communication device to enable it to operate the communication application. An identification of the communication application is also transmitted to the communication device for purposes of tracking its implementation.

A wireless communication device on which the configurations can be implemented includes a heterogeneous set of modules for processing signals and performing device control functions. The communication device as a whole is reconfigurable with respect to the communication protocol used, the type of data (e.g., voice or voice and data) to be transmitted and received, the data rates for transmission and receipt, the quality of service provided (e.g., the maximum allowed error rate), as well as other functional aspects of the device. Reconfiguration of the device is achieved by reconfiguration of the individual modules. More specifically, many of the modules are reconfigurable with respect to their mode of operation by downloading a relatively small set of control parameters. The control parameters for each respective module are used to configure the respective module and thereby control its mode of operation. For some modules, some or all of the control parameters control the operation of software procedures of modules. By reconfiguring the operation of various modules by downloading control parameters instead of by downloading complete new software procedures, the volume of reconfiguration information is greatly reduced, making dynamic reconfiguration of the communication device fast and practical.

BRIEF DESCRIPTION OF THE DRAWINGS

For a better understanding of the invention, reference should be made to the following detailed description taken in conjunction with the accompanying drawings, in which:

FIG. 4A is a block diagram of the reconfiguration information needed to reconfigure the hardware of a reconfigurable communication device for different cases, in accordance with one embodiment of the present invention.

FIG. 4B is a block diagram of profiling information for parameter estimator functions across different communication protocols, in accordance with one embodiment of the present invention.

Like reference numerals refer to corresponding parts throughout the drawings.

DETAILED DESCRIPTION OF THE INVENTION

Figure 1A:
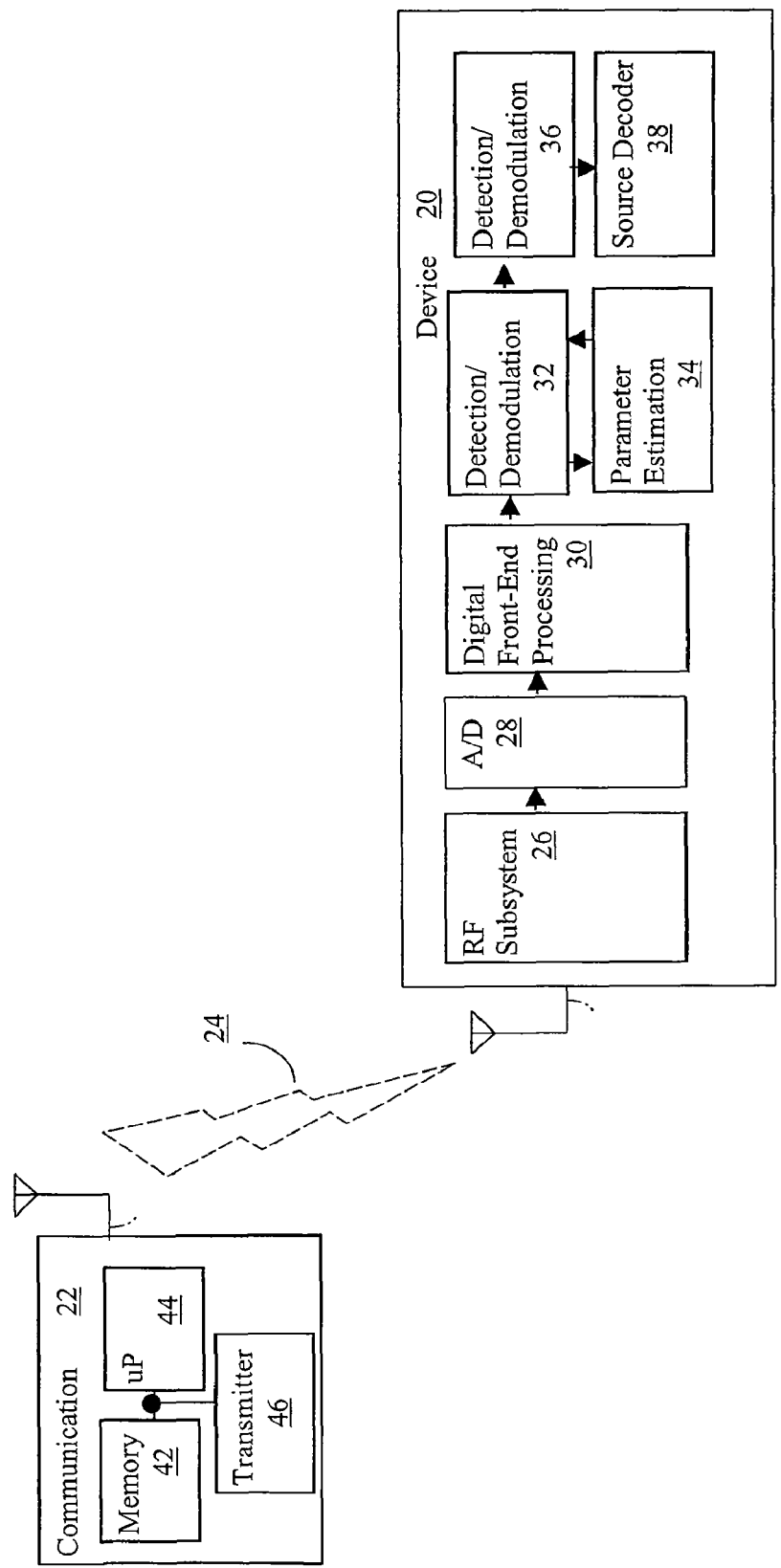
FIG. 1A illustrates a digital communications modem that may be implemented in accordance with an embodiment of the invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital communication systems including direct sequence spread-spectrum (DSSS), time division multiple access (TDMA), frequency division multiple access (FDMA) or orthogonal frequency division multiplexing (OFDM) in both wired and wireless applications, as well as other techniques that utilize data processing such as global position satellite (GPS) systems. Data processing is utilized in wireless communications for many functions including, but not limited to: filtering, searching, modulation, demodulation, encoding, decoding, estimating, etc. The systems or techniques which utilize data processing include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, the present invention is applicable to the following exemplary list of digital direct sequence spread spectrum communication applications. One fixed wireless application to which the present invention may be applied is a metropolitan multipoint distribution system (MMDS). Examples include wireless cable broadcast, or two-way wireless local loop (WLL) systems. Some examples of a W-LAN, that can communicate digitized audio and data packets, for which the present invention can be applied, include OpenAir and the Institute of Electrical and Electronics Engineers (IEEE) specification 802.11b. In yet another application, a specific example of an unlicensed FCC application to which the present invention may be applied include the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARM, 3GPP-FDD, 3GPP-TDD, 3GPP2, 1EXTREME, or other user-defined protocols. The range of code sequences utilized in the exemplary spread spectrum applications disclosed herein, are useful to define the class of functions for which the present configurable code generator unit is applicable. The present invention can also be utilized in any electronic device needing to reconfigure hardware resources.

FIG. 1A illustrates a digital communications modem 20 that may be implemented in accordance with an embodiment of the invention. A transmitter 22 transmits a signal via a channel 24, which may be a wireless or physical channel. The transmitted signal is received at the modem 20, where it is initially processed by a Radio Frequency (RF) subsystem 26. The RF subsystem 26 performs analog mixing, analog filtering, and analog gain control functions. The analog signal from the RF subsystem 26 is then converted to an equivalent digital signal with the analog-to-digital converter 28.

The digital signal is then processed by a digital front-end processing circuit 30, which performs modulation-specific, channel-specific, and standard-specific bandwidth-selection and filtering and sampling-rate control. The signal from the digital front-end processing circuit 30 is then passed to a detection and demodulation circuit 32, which performs signal detection and demodulation operations. The detection and demodulation circuit 32 also interacts with a parameter estimation circuit 34. The output from the detection and demodulating circuit 32 is subsequently processed by a symbol decoder 36 and then a source decoder 38.

The digital functions (30, 32, 34, 36, and 38) of the device 20 are typically implemented on a software-programmable digital signal processor (DSP), or as a fully hardwired, application-specific integrated circuit (ASIC). For lower bandwidth applications (tens of kbps), software-programmable digital signal processors are typically used. For high bandwidth applications (tens of Mbps), a fully hardwired approach is typically employed. This partitioning has and will change over time as the performance of microprocessors and digital signal processors improves.

In accordance with the present invention, the mode of operation of either the DSP or the ASIC may be determined through the use of a set of control parameters. The mode of operation of each such component may be dynamically changed by downloading a new set of control parameters, such as from a remote host, and loading the new control parameters into the component.

Figure 1B:
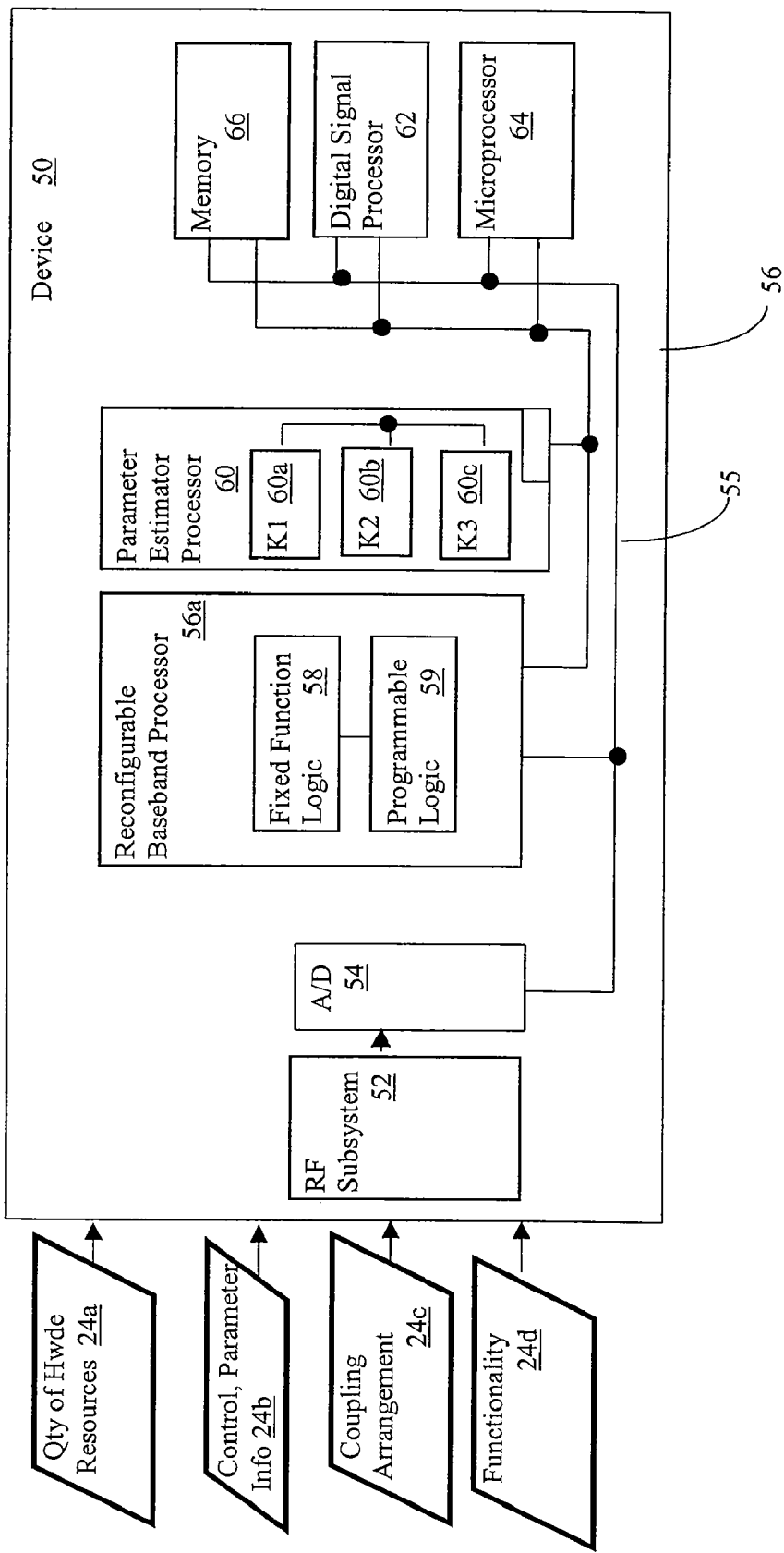
FIG. 1B illustrates a software-programmable, hardware-reconfigurable wireless communication apparatus constructed in accordance with an embodiment of the invention.

The standard functions of the digital communications modem 20 may be mapped to a new architecture, as shown in FIG. 1B. The new architecture exploits a combination of software-programmable cores and hardware reconfigurable logic.

The device 50 of FIG. 1B includes hardware-reconfigurable elements, such as programmable logic 59. Device 50 also features software-programmable elements, such as a microprocessor 64 and a digital signal processor 62.

Device 50 has several inputs in the present embodiment, including input 24a quantity of hardware resources required, input 24b control and parameter information, input 24c coupling arrangement, and input 24d functionality. These inputs are provided in the present embodiment from device 22, e.g., a base transceiver station (BTS), via communication link 24 to configure programmable logic 59 portion of reconfigurable baseband processor. This information is also provided to configure the multiple kernels 60a thorough 60c of parameter estimator processor 60 that can have programmable logic, e.g. dedicated and distributed DSP architecture. The method in which these configuration information inputs are provided to a communication device are described in subsequent flowchart FIGS. 5A and 5B. One embodiment of possible types of configuration inputs that can be provided to a reconfigurable communication device is provided in Appendix A of co-pending U.S. patent application Ser. No. 09/772,584, entitled "A WIRELESS SPREAD SPECTRUM COMMUNICATION PLATFORM USING DYNAMICALLY RECONFIGURABLE LOGIC" by Subramanian et al.,. This related application is commonly assigned, and is hereby incorporated by reference.

The criteria used to map the functions of the circuit of FIG. 1A into the circuit of FIG. 1B will vary, but will typically depend upon several key factors, including: power efficiency, memory requirements, throughput, latency, and flexibility. Function mapping will also rely upon product application space, multi-nation, multi-standard, or multi-service product operation requirements, product development time, and time to market requirements. One embodiment of the criteria used to develop the fixed and programmable (or flexible) portions of reconfigurable baseband processor is described in FIG. 3. While the present invention provides for configurabiltiy in the modem portion of the communication device 20 and 50, the present invention is well suited to applying the techniques and architecture described herein to any portion of a communication device, e.g. a coder/decoder (codec) block, etc.

As in the case of the device of FIG. 1A, an RF subsystem 52 is used in the device 50 of FIG. 1B. The output from the RF subsystem 52 is one or more band pass signals (intermediate frequency signals), which are then digitized by the analog-to-digital converter 54, which is typically implemented as a free-running analog-to-digital converter. The output from the analog-to-digital converter 54 is placed on a bus 55, which may be reconfigurable. Signals from the bus 55 are routed to the reconfigurable processor 56a. Preferably, the reconfigurable processor 56a is implemented with a combination of fixed function logic 58 and programmable logic 59. The reconfigurable processor 56a performs channel selection, sample-rate conversion, digital down-conversion, and digital filtering. This is achieved through the use of multi-rate digital signal processing techniques, software-programmable filter coefficients, rate-conversion, channelization, and loop filter parameters. The reconfigurable processor 56a output consists of complex IQ signals, which are then fed to a parameter estimation processor 60.

The parameter estimation processor 60 performs traditional inner receiver functions via kernels (K1, K2 . . . ), which can be called via software routines from an instruction set processor. Thus, the parameter estimation processor 60 is primarily software-programmable with a limited amount of hardware reconfigurability, primarily with respect to dataflow between estimators and signal conditioning elements. The parameter estimation processor 60 performs channel estimation, correlation, pilot-signal searching, frequency-offset estimation, phase-offset estimation, and timing-error estimation.

The output from the parameter estimation processor 60 is fed to the bus 55, which interfaces with the digital signal processor 62, the microprocessor 64, and memory 66. The digital signal processor 62 and the microprocessor 64 are completely software programmable, and offer the most flexibility with respect to which applications can be executed on the architecture.

Those skilled in the art will appreciate that the hardware-reconfigurable, software-programmable wireless communication device 50 allows for the implementation of multiple standards and services on a single product platform.

Figure 1C:
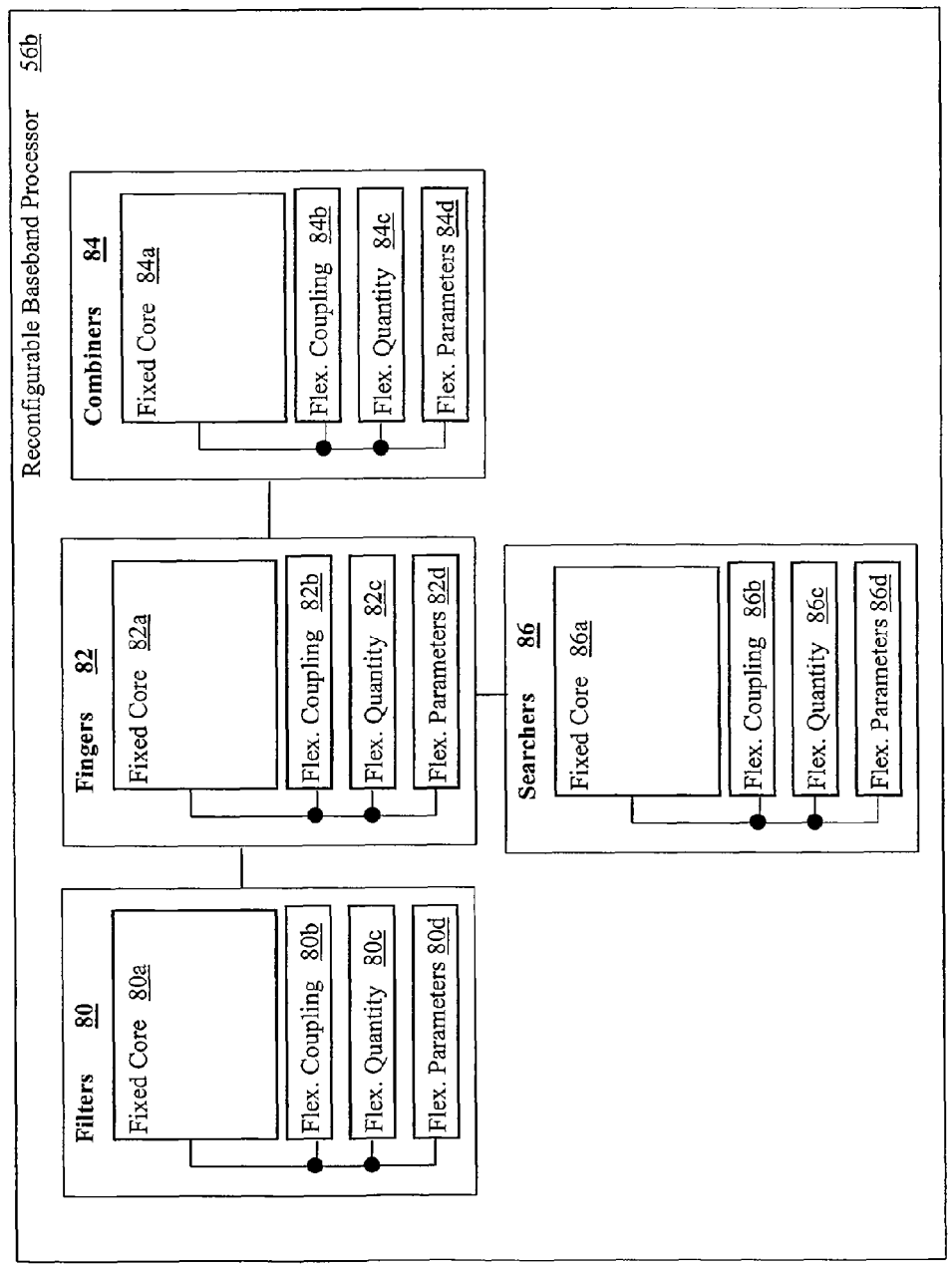
FIG. 1C is a diagram of the flexible and fixed blocks of several functional blocks in a reconfigurable baseband processor, in accordance with an embodiment of the invention.

Referring now to FIG. 1C, a block diagram of the flexible and fixed blocks of several functional blocks in a reconfigurable baseband processor is shown, in accordance with an embodiment of the invention. Reconfigurable baseband processor 56b of FIG. 1C provides a more detailed description of several exemplary functional blocks within the baseband process.

Reconfigurable baseband processor 56b includes filter block (or modules) 80 coupled to finger block 82 that is in turn coupled to combiner block 84. Searcher block is coupled to finger block 82. Each block has a fixed core, e.g., filter core 80a finger core 82a, combiner core 84 and searcher core 86a, respectively. These core portions of the function blocks are implemented in fixed type of hardware that is not reconfigurable or has very limited reconfigurability or programmability in the present embodiment.

Reconfigurable baseband processor 56b also includes flexible portions of functional blocks having flexible coupling hardware block 80b, flexible quantity of hardware 80c, and flexible parameters block 80d coupled to each other in the filter block 80. The flexible portions shown for finger block 82 are flexible coupling 82b, flexible quantity 82c, and flexible parameters 82d coupled to each other. Similarly, flexible coupling 84b, flexible quantity 84c, and flexible parameter 84d blocks coupled to each other, are provided for combiner block 84. And searcher block 86 has flexible coupling 86b, flexible quantity 86c and flexible parameters 86d coupled to each other.

The flexible portions of any functional block can be tailored to the flexibility required for the range of applications. For example, the flexible quantity 82c for finger block 82 can refer to the number of fingers provided for a number of multipaths for a given mobile, while the flexible parameters 82d can be used for flexibly generating symbols from chips to achieve better signal to noise rations (SNR), and the flexible coupling 82b can be provided to satisfy the different demodulating or descrambling operations between different codes and input streams, as required for different communication protocols for which the device is designed to communicate.

In contrast, the commonality of the core for a given functional block is appropriate for the range of communication applications for which the communication device has been designed to implement. By providing a substantial portion of most functions in a fixed core with little or no reconfigurability, improvements in speed and efficiency are obtained. For example, configuration information is not needed in the present embodiment of the core hardware provided for a function block, primarily because it is not configurable. Furthermore, the reconfigurable information required to reconfigure the device is limited to the flexible portions of the function blocks.

The general functions needed by a communication application are known to those skilled in the art. However the specific architecture, e.g., from FIG. 2A, used to accommodate the flexible block of a function block is decided based on profiling analysis in subsequent FIGS. 3, 4A and 4B. Furthermore, the decision to provide specific components and functions in either fixed or flexible blocks is similarly based on the profiling analysis, systems expertise, etc. A wide range of embodiments can satisfy the split of a function block into fixed and flexible portions. Several embodiments are provided hereinafter as exemplary cases. One embodiment of a flexible portion and core (fixed) portion of a finger function block 82 is provided in co-pending U.S. patent application Ser. No. 09/751,783, entitled "A CONFIGURABLE ALL-DIGITAL COHERENT DEMODULATOR SYSTEM FOR SPREAD SPECTRUM APPLICATIONS", by Subramanian. This related application is commonly assigned, and is hereby incorporated by reference. Another embodiment is provided in co-pending U.S. patent application Ser. No. 09/751,785, entitled "A CONFIGURABLE MULTIMODE DESPREADER FOR SPREAD SPECTRUM APPLICATIONS", by Subramanian. This related application is also commonly assigned, and is hereby incorporated by reference.

Although not shown, another function block could be provided in a communication device for transmitter functions. One embodiment of a configurable transmitter function block with fixed and flexible portions is provided in co-pending U.S. patent application Ser. No. 09/922484, entitled "DYNAMICALLY RECONFIGURABLE UNIVERSAL TRANSMITTER SYSTEM", by Medlock et al., filed Dec. 29, 2000. This related application is also commonly assigned, and is hereby incorporated by reference. The benefit of each of these related patent applications is that the fixed portion of the function block for each instance allows operation without configuration information while the flexible portion of the function block allows accommodation of various communication protocols, with only minimal amount of information to reprogram or reconfigure them. Thus, the function block accommodates a variety of applications while only requiring a small amount of configuration information to effectuate the change in communication applications or quality of service.

In one embodiment, the present invention can be implemented for a communication device without time-sharing of function blocks among multiple users, e.g., mobiles. However in another embodiment, the present invention can be implemented in a time sharing model, details of which are available in co-pending U.S. patent application Ser. No. 09/492,634, entitled "IMPROVED APPARATUS AND METHOD FOR MULTI-THREADED SIGNAL PROCESSING", by Subramanian et al.,. This related application is commonly assigned, and is hereby incorporated by reference. Additional information is available in co-pending U.S. patent application Ser. No. 09/920093, entitled "METHOD AND APPARATUS FOR TIME-SLICED AND MULTI-THREADED Data PROCESSING IN A COMMUNICATION SYSTEM," by Rieken et al., filed Jul. 31, 2001. This related application is commonly assigned, and is hereby incorporated by reference.

While the present embodiment provides certain flexibility in certain areas, e.g., parameters and coupling, for noted function blocks, e.g., filters 80 and combiners 84, the present invention is well suited to having more or less configurabiltiy in the function blocks shown or in additional function blocks. The function blocks will have a non-configurable core to the extent permissible by the range of communication applications desired for a given communication device design.

Figure 2A:
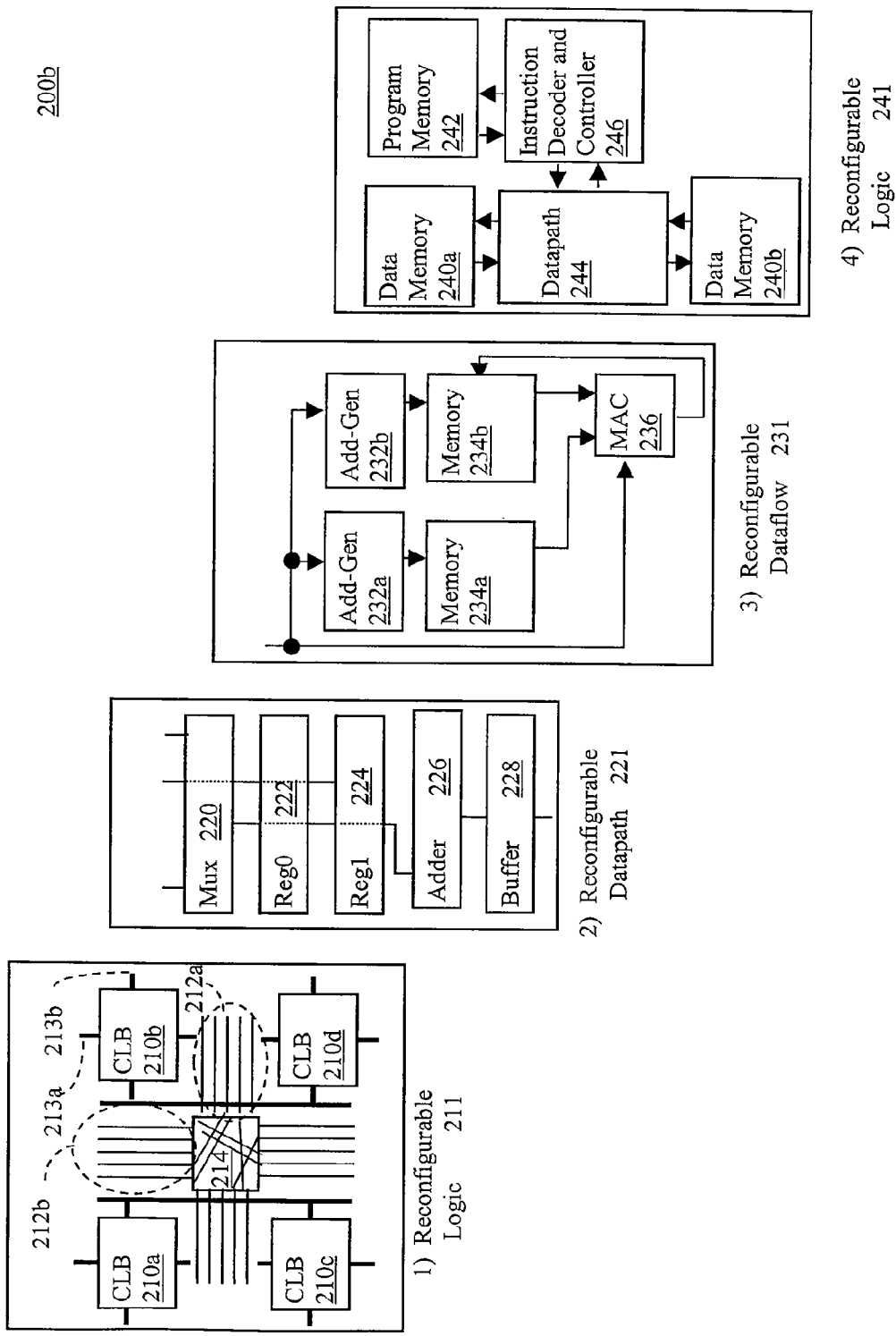
FIG. 2A is a block diagram of multiple possible architecture techniques used in the algorithmic satellite kernel portion of a hardware kernel for a configurable communication device, in accordance with one embodiment of the present invention.

Referring now to FIG. 2A, a block diagram of multiple possible architecture techniques used in the algorithmic satellite kernel portion of a hardware kernel for a configurable communication device is shown, in accordance with one embodiment of the present invention. By using multiple levels of granularity in its components, the communication device possesses a wide breadth of efficient programmability. And efficient programmability translates into accommodating of multiple non-uniform specifications by a communication device. With each level of granularity having its own preferred target for a given application. A systematic and hierarchical method to exploit the flexibility of incorporating these different architectures into hardware is described in a subsequent flowchart figure.

FIG. 2A shows the four main levels of programmable or reconfigurable granularity used in a hardware kernel in the present embodiment. The difference in the various computational models shown in FIG. 2A lies in the granularity of the composing modules, the distribution of the program storage, and the interconnect structure. In one embodiment, the computing elements in a hardware kernel can exploit any combination of the four types of reconfigurability, in an architecture referred to as Dynamically Reconfigurable Logic (DRL), described in more detail hereinafter. However, the present invention is well suited to incorporating other types of computational models that have different levels of granularity or different applications of granularity.

A first architecture format is referred to as reconfigurable logic 211. Reconfigurable logic 211 uses multiple processing islands, also referred to as a configurable logic block (CLB), e.g., 210a coupled by an interconnect 214 with reconfigurability, via bus lines, e.g., 212a, 212b, 213a, and 213b. The reconfigurable logic type of engine relies almost exclusively on bit-level mesh networks in the present embodiment. In the present embodiment, interconnect 214 provides all possible coupling arrangements between the bus of data liens 212a and 212b. In this manner, independent blocks 210a-210d can communicate with one another in any desired manner. That is, they are not restricted to communicating with less than all existing kernels due to limited hardware wiring. In another embodiment, interconnect 214 can provide only a limited amount of interconnectabiltiy, based upon perceived needs and capabilities of each kernel for a given application. Reconfigurable logic 211 uses bit-level operations such as encoding. By itself, reconfigurable logic provides significant benefits of flexibility. However, the flexibility comes at a tradeoff of inefficiency in chip area and in power consumption. In one embodiment processing islands have unrestricted reconfigurability of its component logic devices.

A second architecture format is referred to as reconfigurable datapath 221. The interconnect network of the reconfigurable datapath exploits the bit-sliced structure and predominantly one-dimensional flow of data by using asymmetric network-reconfigurable buses in one direction and bit-level mesh in the other direction. That is, reconfigurable datapath 221 uses dedicated datapaths to transmit data between electronic components, such as mux 220 and adder 226. For example, multiplex (Mux) block 220 can multiplex data from multiple data lines onto a single data line, thus changing the data path. Additionally, data may be directed along one of multiple paths to an appropriate storage register, e.g., register 0 (Reg0) or register 1 (Reg1). From an appropriate storage register, data may be directed along a path to a given function block, e.g., adder 226 or buffer 228. Reconfigurable datapath 221 can efficiently move data, but it lacks flexibility that is not built into the original architecture. Thus, for example, the data path is limited to the data lines built between components, e.g., 220 through 228.

A third architecture format is referred to as reconfigurable dataflow 231. With reconfigurable dataflow, control exists over the type of arithmetic used in a processing unit (i.e. dataflow process). The reconfigurable dataflow architecture uses a program and data bus that feeds data and control instructions to a computation unit. In particular, block 232a and 232b generate addresses to get data from memory, e.g. 234a and 234b, to be sent to a multiply—accumulate (MAC) block 236 for processing.

A fourth architecture format is referred to as reconfigurable logic 241. Reconfigurable logic 241 refers to a real-time operating system (RTOS) where the outside source controls the type of state machines that control the dataflow process (i.e. controlflow process). With reconfigurable logic 241, the stored-instruction engines rely on shared buses for the transfer of data and instructions. Block 240 is the data memory storage of data to be processed, while block 242 is the program memory for storing program instructions used to run on instruction decoder and controller 246. Block 394 is the datapath block, which contains the arithmetic operations for processing the data. Memory block 390b is a second bank of data memory for interfacing data with data path block 394.

By combining these four types of architecture, as described hereinafter, in a manner that matches the programming, function, or temporal granularity needed for a given algorithm, function, application, and/or classes thereof, the present invention provides a hybrid architecture and system. This hybrid architecture and system provides substantial improvements in performance over previously irreconcilable tradeoffs of speed, flexibility, and efficiency. Examples of these four types of architecture can be found in different aspects of the US patent applications incorporated by reference hereinabove.

Figure 2B:
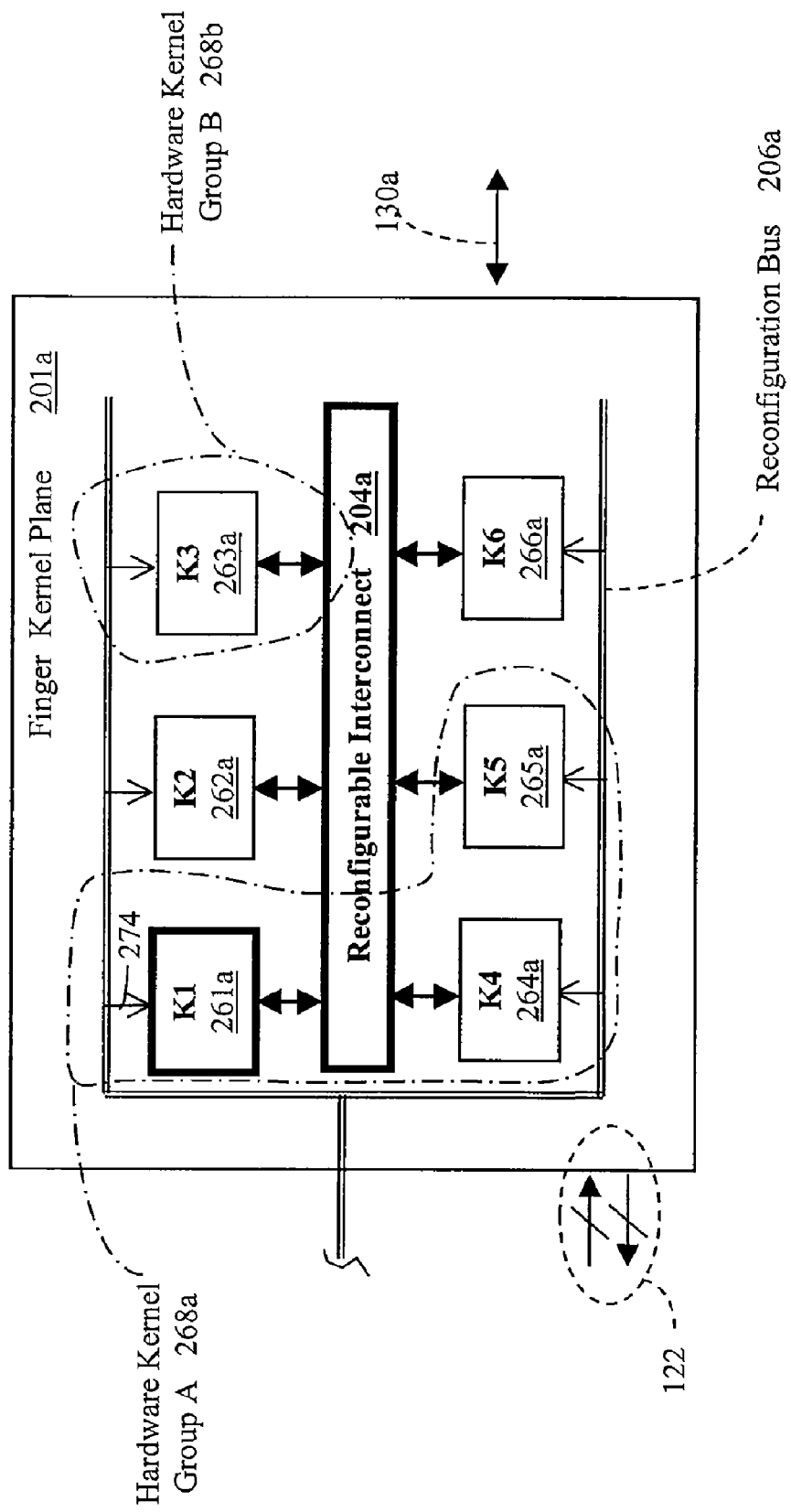
FIG. 2B is a block diagram of a configurable hardware kernel plane for a reconfigurable communication device, in accordance with one embodiment of the present invention.

Referring now to FIG. 2B, a block diagram of a configurable hardware kernel plane for a reconfigurable communication device is shown, in accordance with one embodiment of the present invention. Hardware kernel plane 201a provides the capability of reconfigurability for a range of protocols in an application, or within a range of applications, with an efficiency that challenges conventional circuits. Additionally, hardware kernel plane 201a is modular, and thus may be designed to operate in groups. Kernel plane 201a represents one embodiment of implementing finger kernel plane 82 of FIG. 1C.

Kernel plane 201a includes multiple hardware kernels K1 261a through K6 266a that are coupled to a reconfigurable interconnect 204a. Data is passed between kernels K1 261a through K6 266a via reconfigurable interconnect 204a. Control information, such as handshake protocol signals, can also be routed through reconfigurable interconnect 204a. Hardware kernel, e.g., K1 261a, is described in detail in a following figure. Interconnect architecture supports sufficient concurrency within each of the hardware kernels K1 261a through K6 266a. In the present embodiment, reconfigurable interconnect 204a utilizes a hierarchical structure that can support the required interconnect patterns (as described by the dataflow in following flowchart figures), as well as provide good performance and energy efficiency for every configuration. While the present embodiment uses six hardware kernels, the present invention is well suited to using any quantity of kernels in kernel plane 201a. Kernels in FIG. 2B are one embodiment of implementing kernels shown in FIG. 1B.

In the present embodiment, hardware kernels K1 261a through K6 266a kernels are specific to the types of data processing found in wireless communication applications, such as CDMA. However, at the same time, hardware kernels K1 261a through K6 266a are heterogeneous with respect to one or more of each other, in terms of programmability, algorithmic-capability, performance-level, and/or math-logic. However, two or more kernels within kernel plane 201a can be homogeneous with respect to each in another embodiment. The specific composition and relationship between hardware kernels depends upon the specific application. Examples of these levels of programmability are provided in a subsequent figure. One or more of hardware kernels K1 261a through K6 266a are also autonomous with respect to each other, thus allowing parallel processing of data, on a kernel-by-kernel basis, or on a kernel-group by kernel-group basis. Because of this autonomy, and local control, the individual hardware kernels as well as the hardware kernel plane is data-rate scalable to a range of system clock rates.

Kernels K1 261a, K4 264a, and K5 265a are grouped together in hardware kernel group A 268a. Similarly, hardware kernel K3 263a is identified as a sole kernel within hardware kernel group B 268b. These two exemplary kernel groupings provide a class of functions for the present host communication device which applies them to a wireless communication protocol application, as will be described in a subsequent flowchart figure.

Hardware kernels, e.g., kernel K1 261a are coupled to a configuration (or reconfiguration) bus 206a, e.g., via line 274. Configuration, status, and control information are passed to kernels K1 261a through K6 266a via reconfiguration bus 206a, in the present embodiment. However, the present invention is well suited to passing different types of data and information using a wide variety of data lines and data bus configurations. Configuration information from input 24a through 24d of FIG. 1B can be provided by a bus in communication device 50 that represents bus 206a of FIG. 2B.

Reconfigurable interconnect 204a has an architecture that is primarily a reconfigurable logic 211, as described in FIG. 2B. In this embodiment, reconfigurable interconnect 204a provides connectivity between input/output lines of multiple kernels, or between input/output lines of a kernel with components outside of kernel plane, e.g., a host processor 64 of FIG. 1B, or other data buses (not shown). Data is passed between kernel plane 201a and the host communication device via an input/output line, e.g., line 122, that is coupled to reconfigurable interconnect 204a. Input/output line 122 is provided in one embodiment by line 56 of FIG. 1B.

In one embodiment, reconfigurable interconnect 204a has only a limited amount of reconfigurability based upon the specific needs identified for a class of protocols in a given application, or for a class of applications. That is, based on an application, algorithm, function, operation, or class thereof, not all kernels will be required to have full interconnectabiltiy with all other kernels. Consequently, the present embodiment provides limited reconfigurability of interconnect 204a between kernels depending upon the needs of the application, function, algorithm, etc. for which a kernel is designed. The limitation on interconnectabiltiy provides the benefit of reconfigurability where it is needed, and restricts interconnectabiltiy where it is not needed. Thus, the inefficiently of a totally reconfigurable interconnect is tempered by identifying strategic cases where reconfigurability is appropriate. The strategic scenarios involve the class of functions to be performed, the design of individual kernels K1 261a through K6 266a to accommodate the class of functions, and the level of programmability provided for outside control. The common ground between the class of functions, operations, or algorithms is a case-by-case basis requiring analysis of variables such as mathematical basis, signal processing operations, algorithmic patterns, and silicon implementation.

Data is provided and received from kernel plane via data bus 122 or data line 130a. In the present embodiment, an input data line portion of data bus 122 is coupled to one side of reconfigurable interconnect 204a to provide data input to kernel plane 201a. Similarly, an output data line portion of data bus 122 is coupled to the other side of reconfigurable interconnect 204a to receive data from kernel plane 201a. Data that is provided to reconfigurable interconnect 204a is then routed to appropriate kernels K1 261a through K6 266a per configuration information provided to communication device. Alternatively, an input line portion of data bus 122 can be directly coupled to one or more of kernels K1 261a through K6 266a, e.g., if this functionality of a particular kernel is consistent across a range of spread spectrum applications. For example, if a kernel plane for a modem operation always initially performs an interpolation filter operation on input data regardless of the applications within a class of spread spectrum communications, then input data line may be routed directly to the kernel responsible for this function. The same coupling arrangement can be provided for data line 130a with respect to reconfigurable interconnect 204a and kernels K1 261a through K6 266a. While the present embodiment provides for less than full interconnectability, the present invention is well suited to providing the full interconnectability between all kernels.

The modem signal processor is one instance of the heterogeneous reconfigurable architecture, which can be configured to provide a complete signal path for multichannel operation of a CDMA base-station. The hardware kernel processors were designed with a strong focus on applying the flexibility vs. computational efficiency trade-off to the specific needs of an application. As such, a rank ordering of the dominant computation-intensive kernels found in the algorithms is identified. For example, in a typical WCDMA application, the dominant computations are centered around five major signal processing functions: chip matched filtering, code-epoch search, chip demodulation/despreading, channel decoding, and inter-path (IPI) equalization (optional). While the present invention provides an enumerated list of computational categories for a hardware kernel, the present invention is well suited to using specific quantities and types of categories as is appropriate for a given application.

Bus 206a of FIG. 2B is selectively reconfigurable to provide only the needed amount of interconnectivity to a kernel based upon the application, function, and/or algorithm, for which a kernel is designed. For example, in one embodiment, kernel K3 263a does not require a status flag because the operation it performs requires no feedback and is run to completion. Thus, reconfiguration bus 206a provides no bus capability to kernel K3. In another embodiment, however, interconnectivity to provide communication of status information between a hardware kernel with another hardware kernel or allocator can be provided.

Figure 2C:
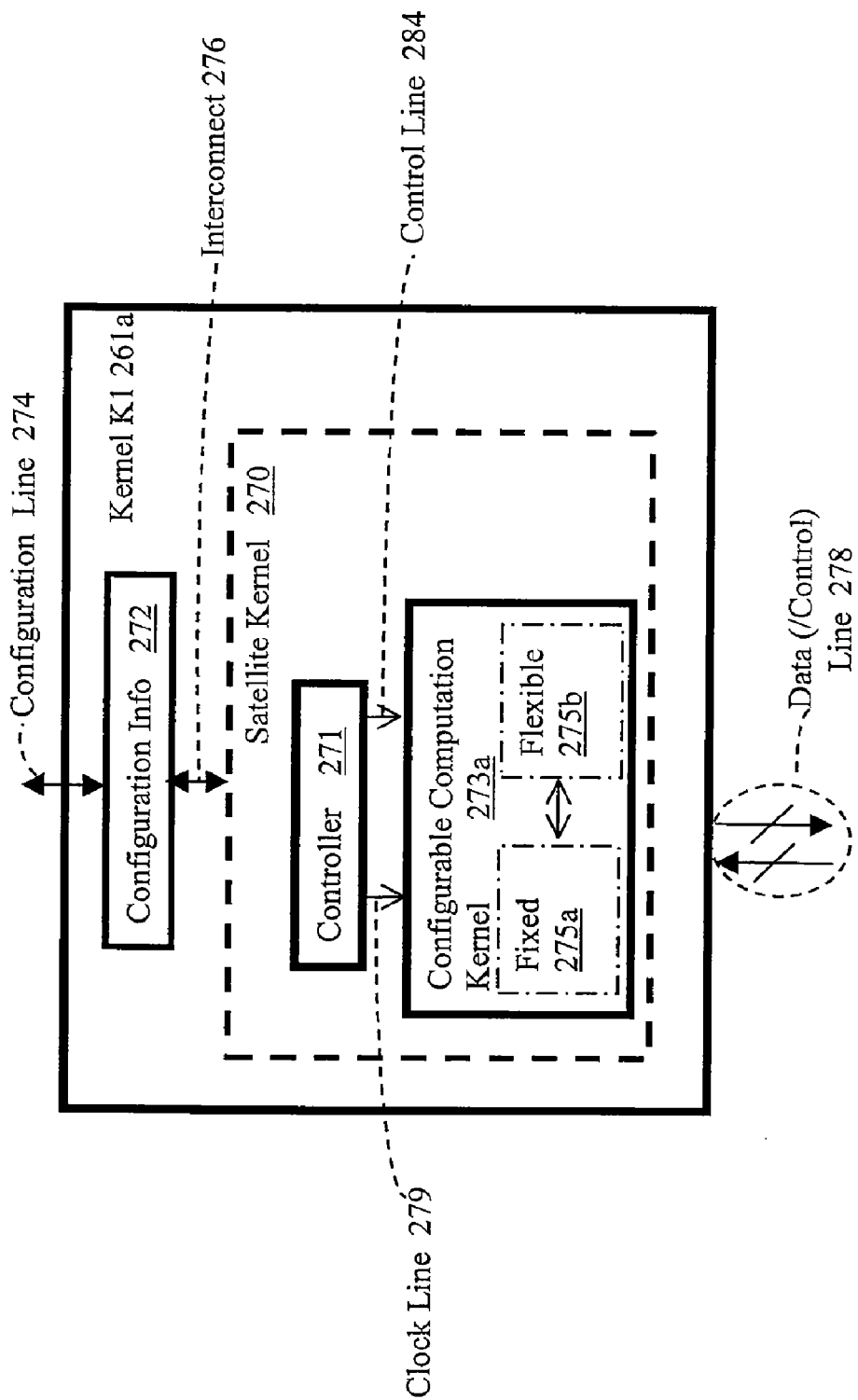
FIG. 2C is a block diagram of a kernel portion of a hardware kernel plane for a reconfigurable communication device, in accordance with one embodiment of the present invention.

Referring now to FIG. 2C, a block diagram of a kernel portion of a hardware kernel plane for a reconfigurable communication device is shown, in accordance with one embodiment of the present invention. Kernel K1 261a provides one embodiment of many possible embodiments, which any of multiple hardware kernels in a kernel plane may use.

Kernel K1 261a includes a configuration information block 272 and a satellite kernel block 270, coupled to each other by interconnect 276. Satellite kernel 270 has an input/output data line 278, which is a bus in the present embodiment, that provides communication with reconfigurable interconnect 204a of FIG. 2B. Similarly, configuration information block 272 is coupled with reconfiguration bus 206a of FIG. 2B, via configuration line 274. In one embodiment, configuration line 274 is a bus into configuration information block 272, or can be a single line with multiplexed data. The amount of data the bus or single line can handle can vary widely, depending upon the needs of an existing or projected application. Satellite kernel 270 is an electronic device, which is algorithmic specific in the present embodiment.

Configuration information block 272 is random access memory (RAM) in the present embodiment. However, the present invention is well suited to using any medium for configuration information block 272 that can preserve and communicate a state condition for electronic devices. For example, configuration information block 272 can be registers, flash memory, or a state machine, e.g., using reconfigurable logic, that provides bit stream of states to satellite kernel block 270. By having configuration information block 272 as a local dedicated source, that can also be controlled local to satellite kernel 270, this arrangement provides a very quick and efficient changing of configuration data for algorithmic satellite kernel 270. Consequently, time-sharing of a hardware kernel is feasible and practical in the present embodiment.

In the present embodiment, hardware kernels e.g., K1 261a through K6 266a of FIG. 2B, have been designed to fit into one of multiple categories of data processing applicable to wireless communication. The category of data processing refers to the operational speed of the hardware kernel, which includes an energy-flexibility tradeoff. The specific category for which a hardware kernel is designed is determined from the number and type of operations per sample of data processed in the hardware kernels. The present embodiment utilizes five domains of signal processing categories for a wireless communication system. They include: 1) Sub-chiprate (M times chip-rate=Mfc); 2) Chip-rate (chip-rate=fc); 3) Sub-symbol rate (fc/L, with multiple chips per processing period, which is less than one symbol interval); 4) Symbol-rate (fc/N=fs=symbol rate); and 5) Multi-symbol rate (fs*K, with multiple symbols per processing period, which spans more than one symbol).

The kernel processors cover the multi-standard CDMA signal processing requirements, and can be categorized corresponding to classes of MOPS. In the present embodiment, signal processing for a wireless communication application includes the following classes of MOPS: 1) Code Demodulation/Dechannelization; 2) Code Generation; 3) Parameter Estimation; 4) Sequence Alignment and Combining; 5) Equalization (optional); and 6) Front-end Processing.

Satellite kernel 270 includes a controller 271 and a configurable computation kernel (or algorithmic-specific computing element) 273a, coupled to each other via a clock line 279 and a control line 284. Configurable computation kernel 273a is also referred to as a computing element or a processing engine.

Controller 271 includes a state machine with memory, in the present embodiment, that is capable of controlling configurable computing element 273a. In another embodiment, controller 271 includes only memory that is capable of preserving state conditions of at least one configuration of configurable computing kernel 273a. To achieve distributed control, kernel K1 261a is equipped with an interface that enables it to exchange data streams with other kernels efficiently, without the help of a global controller. Hardware kernel K1 261a uses a distributed control and configuration via local controller 271, which effectively reduces overhead in terms of instruction fetch and global control. Kernel K1 261a also includes an interface, e.g., in configurable computation kernel 273a, that enables it to exchange data streams, e.g., data line 278, with other kernels efficiently, without the help of a global controller. The communication mechanism between each kernel is dataflow driven in the present embodiment. Local controller 271 can provide local control signals for initiation, reset, and interrupt for configurable computation kernel 273a, as well as scaled clock rates.

In the present embodiment, configurable computation kernel 273a is designed specifically to perform a given algorithm, function, operation, or class thereof. Therefore, satellite kernel 270 has flexibility, e.g., reconfigurability, within the class of functions, operations, or algorithms to which it has been designed. By virtue of the fact that configurable computation kernel 273a is designed for a relatively narrow application in the present embodiment, it is consequently very energy efficient. Thus, it meets the needs of a wide range of communication protocols within a spread spectrum category, while being very efficient. Additionally, because satellite kernel 270 has its own local controller 271, it operates autonomously with respect to the balance of the kernels in a hardware kernel plane, and to the balance of the communication device. Thus, satellite kernel 270 can be activated or bypassed for a given function of an application, depending on the needs and protocol chosen for the application. A description of the configuration and operation of a satellite kernel 270 is presented in a subsequent flowchart. The present architecture is well suited to a wide range of data processing functions, operations, and applications besides spread spectrum communication applications.

In the present embodiment, computing element 273a includes an architecture of electronic devices with coupling arrangements, from one or more of the possible techniques described in FIG. 2A. That is, depending upon the function, algorithm, operation, or class thereof, being implemented by the hardware kernel, computing element 270 can include any combination of the techniques for device choice and configuration, including reconfigurable logic 211, reconfigurable datapath 221, reconfigurable dataflow 231, or reconfigurable logic 241. In the present embodiment, the computing element in a hardware kernel, e.g., computing element 273a of K1 261a, can exploit any combination of the four types of reconfigurability, in an architecture referred to as Dynamically Reconfigurable Logic (DRL). However, the present invention is well suited to incorporating other types of computational models that have different levels of granularity or different applications of granularity. Additionally, the techniques of FIG. 2A used in configurable hardware kernel can be chosen depending upon the uncertainty of a design or function within the communication device. Thus, by providing a very flexible architecture to an autonomously controlled configurable hardware kernel for the narrow scope of an uncertain function or algorithmic technique, the present invention frugally allocates the most flexible reconfiguration resources. However, the present invention is well suited to complementing these enumerated techniques with other configuration and architecture techniques.

Because the computing element 273a is function (or algorithmic) specific each of the techniques used is subsequently function specific. Thus, the electronic devices and their interconnections can utilize function-specific reconfigurable logic 211, function specific reconfigurable datapath 221, function-specific reconfigurable dataflow 231 and/or function specific reconfigurable logic 241 techniques as shown in FIG. 2A in one embodiment. The function-specific aspect of the devices and their interconnects means that the device is only effective and useful for the intended function, sub function, or classes thereof, in this embodiment. By doing so, this architecture efficiently delivers a class of MOPS with flexibility in the configuration of these MOPS and scalability across data rates and channel densities.

Electronic devices refer to the basic building blocks of electronic circuits such as transistors, diodes, resistors, conductors, and other elements that are well known in the art. The collection of electronic devices and interconnects can be figuratively divided into a fixed grouping 275a and a flexible grouping 275b, intercoupled to each other on a device level, as required by the function implemented therein. For example, in one embodiment, flexible architecture can be used to selectively group and couple registers to implement a class of functions whose math operations vary by their bit length, depending on the protocol used.

Thus, each of the multiple hardware kernels described in FIG. 2B have an architecture that is tuned to its intended function. In the present embodiment, the combination of architecture in a computing element is dependant upon the functions, or class of functions, to be performed by the hardware kernel. Other variables, such as performance requirements, user preferences, future expandability into undefined protocols are also included as inputs in the choice of architectures. Because the hardware kernels each have a discrete function, operation, or class thereof, they can be evaluated as true object-oriented hardware.

Resultantly, a channel element can be built-up from the set of configurable hardware kernels to realize a reconfigurable multi-channel digital base band modem signal path that performs all the digital modulation-demodulation as well as channel encoding-decoding required per logical channel for all narrowband and wideband telecommunication standards. In the present embodiment, kernel plane can form a modem card in a systematic and modular fashion in modules of multiple channels per card, depending on their radio (cell-site) system planning. The present invention can be adapted to accommodate a wide range of channels.

In the present embodiment, two or more types of configurable architecture techniques are used in a given hardware kernel. However, the present invention is well suited to using a single type of configurable architecture is used in a given hardware kernel. Additionally, the kernel compositions can vary within a hardware kernel plane, and between hardware kernel planes. Multiple types of architecture can be strategically located and coupled within a hardware kernel to accommodate the particular variation in the function/sub function desired. For example, if the variation for sample select sub function over IS2000, and 3GPP, 3GPP-FDD, 3GPP-TDD, and 1Xtreme protocols includes the number of bits selected, then the hardware kernel includes a reconfigurable logic for the interconnect bus and the storage location associated with the range of bits and a reconfigurable datapath for the balance of the circuit.

The present invention is well suited to using a wide range of architectural techniques shown in FIG. 2A, and combinations thereof, from which individual hardware kernels are designed, constructed, and operated. These hardware kernels are capable of performing a wide range of functions within a class that spans a wide range of spread spectrum applications. Exemplary functions, for which kernels can be configured, are described in Appendix A, entitled "Data Kernel Specification List" of the US patent application incorporated herein by reference hereinabove, entitled "A WIRELESS SPREAD SPECTRUM COMMUNICATION PLATFORM USING DYNAMICALLY RECONFIGURABLE LOGIC."

Several exemplary hardware kernels have been defined in related co-pending patent applications and are applicable in the present communication device, e.g., 100 of FIG. 1b. While these related patent applications provide a specific function for hardware kernels, the present invention is well suited to a wide range of data processing functions for electronic devices, such as a spread spectrum communication device. These commonly assigned and related applications, which are incorporated herein by reference, include:

1) "A CONFIGURABLE CODE GENERATOR SYSTEM FOR SPREAD SPECTRUM APPLICATIONS,"U.S. patent application Ser. No. 09/751,782, filed on Dec. 28, 2000;
2) "A CONFIGURABLE MULTIMODE DESPREADER FOR SPREAD SPECTRUM APPLICATIONS, incorporated by reference hereinabove,
3) "A CONFIGURABLE ALL-DIGITAL COHERENT DEMODULATOR SYSTEM FOR SPREAD SPECTRUM APPLICATIONS," incorporated by reference hereinabove; and
4) "METHOD AND APPARATUS FOR PROCESSING A SECONDARY SYNCHRONIZATION CHANNEL IN A SPREAD SPECTRUM SYSTEM,"U.S. patent application Ser. No. 09/772,583, filed on Jan. 29, 2001. The reconfigurable techniques and the allocation of functions to fixed or flexible logic in the several embodiments above provide several examples of how a small and efficient amount of configuration information can change a function to accommodate different communication applications, or protocols. The term 'architecture' describes the electronic devices and coupling arrangements used in configurable hardware kernel plane 201a of FIG. 2B, Kernel K1 261a of FIG. 2C, reconfigurable interconnect 204a of FIG. 2B, and the specific exemplary hardware kernels provided in the aforementioned applications. The coupling arrangements include interconnect routing, grouping, and hierarchy. The various combinations of reconfiguration techniques 211, 221, 231 and 241 of FIG. 2A also describe the architecture of the configurable computation kernel 273a, the reconfigurable interconnect 204a, and the specific exemplary hardware kernels. Devices can include components such as gates, selective interconnects, memory, lines, buses, and a wide range of conventional devices that are chosen and coupled in order to satisfy the functional requirements of a given application. More information on architecture of configurable devices can be found in the text "Software Radio Architecture," by Joseph Mitola III, which is hereby incorporated by reference.

Profiling Fixed and Flexible Portions of Communication Device

Figure 3:
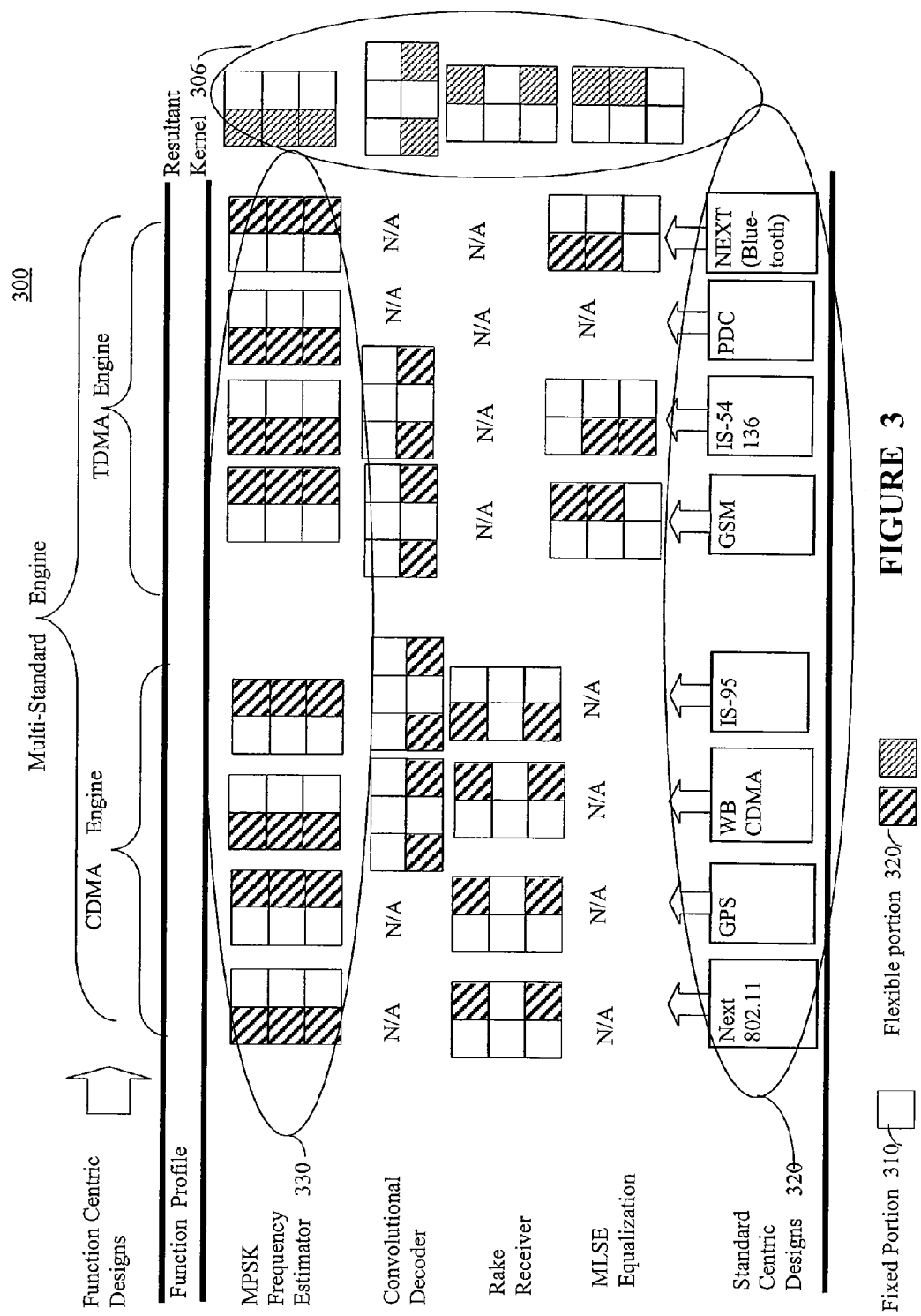
FIG. 3 is a block diagram of a profiling technique to determine the fixed and flexible portions of a hardware kernel plane for a reconfigurable communication device, in accordance with one embodiment of the present invention.

Referring now to FIG. 3, a block diagram 300 of a profiling technique to determine the fixed and flexible portions of a hardware kernel plane for a reconfigurable communication device is shown, in accordance with one embodiment of the present invention. The method to determine the fixed and flexible portions of a functional block for a communication device and the resulting apparatus is dependant upon the type and quantity of communication applications for which the device is designed to accommodate. Thus, FIG. 3 provides an early definition of what configuration information will be transmitted by one communication device, e.g., 22, via medium 24, to another communication device 20 to configure its flexible components, e.g., FIG. 1C, to the desired communication application.

FIG. 3 represents the results from profiling a function across multiple communication applications 320, e.g., fixed wireless 'Next' 802.11, global positioning system (GPS), wideband code division multiple access (WB CDMA), IS-95, global system for mobile communications (GSM), IS-54 136, PDC, and NEXT (also referred to as Bluetooth). Any one of many different functions, e.g., MPSK frequency estimator 330, can be evaluated across the different communication applications for commonality and variation in functions. The common portion of the functions can be provided in fixed logic, while the variation can be provided for in the flexible logic, or the flexible portion of the functional block. The crosshatched blocks 308 represent the flexible portion of the functional block required to implement a communication application (or standard), while the white block 310 represents a fixed portion. The rectangles in the present embodiment represent the functional component collections, which make up each canonical function. Each rectangular function component collection is divided into a multiplicity of squares, with each square representing a single component.

By comparing all the rectangular blocks, and their implicit details, for each desired communication application on a function-by-function basis, a resultant definition of the flexible and fixed portions of the functional block can be chosen, e.g., resultant kernel 306. There are significant potential tradeoffs in the actual decision as to which functional features are accommodated in fixed or flexible logic. Because flexible logic, such as field programmable gate arrays, multiplexers, mask circuits, etc. can be expensive in terms of power, control logic, and other overhead requirements, they are implemented as infrequently as possible in one embodiment while still maintaining the desired flexibility across multiple communication applications.

Additional information on one embodiment of a flexible and core portion of a finger function block 82 is provided in co-pending U.S. patent application Ser. No. 09/565,654 entitled "METHOD OF PROFILING DISPARATE COMMUNICATIONS AND SIGNAL PROCESSING STANDARDS AND SERVICES", by Subramanian. This related application is commonly assigned, and is hereby incorporated by reference.

Referring now to FIG. 4A, a block diagram of the reconfiguration information needed to reconfigure the hardware of a reconfigurable communication device for different cases is shown, in accordance with one embodiment of the present invention.

FIG. 4A provides table 400 that cross references exemplary scenarios for configuration of a communication device according to the reconfigurable portion of the function block affected. Thus, for example, if an air interface change were to occur, e.g., from IS-95 to IS-2000, the filter, finger, combiner, searcher, estimator, timing and codec function blocks would be affected. In this case, configuration information would have to be provided for a significant quantity of function blocks, albeit a reasonable amount of configuration information for each function block. In another embodiment, a quality of service (QOS) change arises by switching from non-antenna diversity to an antenna diversity reception because a user has an inadequate signal. In yet another embodiment, configuration information can be utilized for a change in service options.

For example, a GPS position request could require changes to the function blocks of finger, combiner, searcher, estimator, timing and codec in aspects shown in table, e.g., connectivity, and parameters, and quantity. While the present invention provides exemplary specific changes to specific flexible portions of the function blocks of a communication device to accommodate the changes in communication application, the present invention is well suited to a wide range of factors that will or will not change in the functional block, depending upon the fixed and flexible portions designed in the communication device.

These scenarios can be provided manually in one embodiment, or automatically without user involvement in another embodiment. The automatic implementation could depend upon performance of a communication device, e.g., poor reception forces space and/or time diversity communication, or some other factor that would necessitate the use of a new or different communication application, e.g., a call to 9-1-1 would implement the GPS function to automatically transmit the location of the mobile unit.

The dynamic reconfiguration of a communication devices is useful for situations in which a device is "roaming" between communication systems that utilize different communication protocols, signal encoding methods and the like. That is, it would be beneficial for a mobile communication device to be dynamically reconfigured so as to be compatible with whatever wireless communication system it comes into contact with. FIG. 4A identifies the set of function blocks (or modules) that would be dynamically reconfigured in order to change the mode of operation of a wireless communication device from IS2000 to IS-95 or vice versa.

A wireless communication terminal is implemented using a heterogeneous set of modules for processing signals and performing device control functions, e.g., as shown in FIG. 2B. The communication device as a whole is reconfigurable with respect to the communication protocol used, the type of data (e.g., voice or voice and data) to be transmitted and received, the data rates for transmission and receipt, the quality of service provided (e.g., the maximum allowed error rate), as well as other functional aspects of the device.

Reconfiguration of the device is achieved by reconfiguration of the individual modules. More specifically, many of the modules are reconfigurable with respect to their mode of operation by downloading a relatively small set of control parameters (also called configuration parameters). The control parameters for each respective module are used to configure the respective module and thereby control its mode of operation. For some modules, some or all of the control parameters control the operation of software procedures of modules, while for other modules the control parameters determine hardware functions. To change the mode of operation of the wireless communication terminal control parameters are downloaded from a host system, typically via a telephone network base station, e.g., as shown by device 22 in FIG. 1A, for each of the modules whose mode of operation will be changed. Thus, if N modules are affected by a particular change, N sets of control parameters will be downloaded into the terminal, internally verified, and then loaded into their respective modules. In a preferred embodiment, the size of the control sets is typically less than ten percent of the size of the software procedures that would have to be downloaded so as to make a comparable change in operation of a devices whose operation is controlled by DSP procedures. The control parameters are very compact compared to DSP software procedures. This mode of reconfiguring the operation of various modules of the device makes dynamic reconfiguration of the wireless communication terminal fast and practical.

Referring now to FIG. 4B, a block diagram of profiling information for parameter estimator functions across different communication protocols is shown, in accordance with one embodiment of the present invention. FIG. 4B provides a table 401 that is applicable to profiling a given communication device for a variety of communication applications.

In the present embodiment the table is provided for two communication protocols, namely TDMA and CDMA, similarly to the diagram in FIG. 3. The specific functions under the first column 'Hardware' reflect the functions accommodated by the parameter estimator, e.g., parameter estimator 60 of FIG. 1B. As is apparent from table 401, several functions, e.g., ML symbol timing estimator, and ML carrier phase estimator are common across all communication applications listed on the table. Each function can subsequently be broken down into sub functions. Again, commonality of sub functions across multiple communication applications will allow a maximum amount of commonality in function and hardware, while providing a degree of flexibility to accommodate the differences between functions. Thus, common functions or sub functions can be included as part of the fundamental code and architecture of the parameter estimator. The balance of the functions can be provided for in a parameter estimator with algorithms and code having efficiency and usefulness tailored to the degree and frequency of their implementation. By using the table for analysis and by concluding on the type and scope of code provided as default and as subsequent flexible add-on code, the present invention can provide a component, e.g., parameter estimator, having a wide range of configurabiltiy, e.g., across many varied communication applications, with minimal software download and reconfiguration time required.

Processes

Figure 5A:
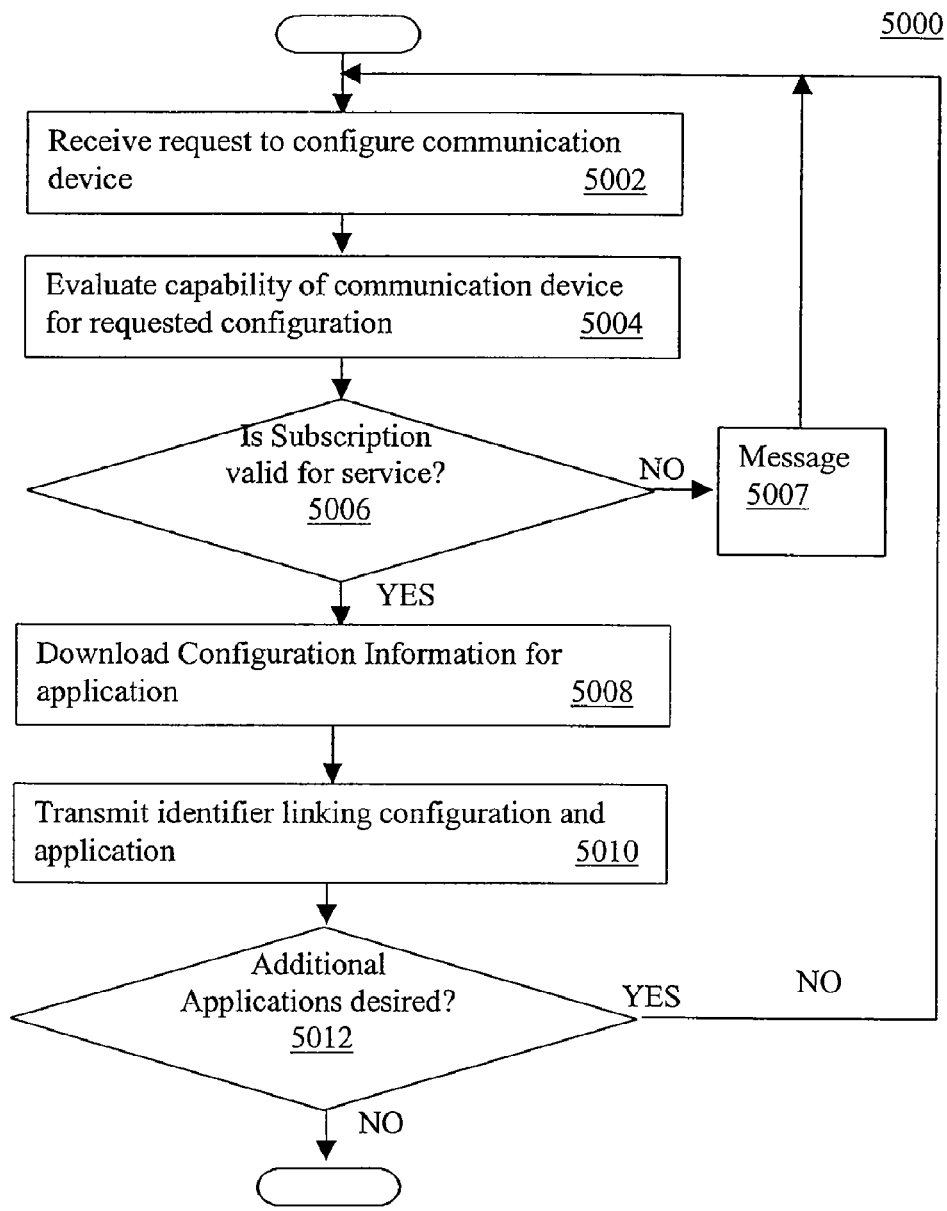
FIG. 5A is a flowchart of the process used to transmit configuration information to the reconfigurable communication device, in accordance with one embodiment of the present invention.

Referring now to FIG. 5A, a flowchart of the process used to transmit configuration information to the reconfigurable communication device is shown, in accordance with one embodiment of the present invention.

Flowchart 5000 starts with step 5002, wherein a request is received to configure a communication device. The request can be received at a host communication device, e.g., a base station 22, from a remote device, e.g., modem mobile unit 20, in one embodiment. Alternatively, host communication device 22 can also provide the configuration as a default transmission in another case, e.g., for a new mobile. In one embodiment, the communication device being considered for configuration has a default communication application thereon. In another embodiment, the communication device is inoperable to a class of communication applications without receiving configuration information first. Following step 5002, flowchart 5000 proceeds to step 5004.

In step 5004 of the present embodiment, the capability of the communication device is evaluated for the requested configuration. Step 5004 is implemented in one embodiment by having communication device, e.g., 20, provide a signal with its capability, e.g., in terms of applications capacity or identification such as model number of the device itself, etc. The host unit can either evaluate the communications applications details sent or use a look up table in memory to cross-reference an identification with a capability. Step 5004 provides the benefit of ensuring appropriate configuration information be sent to the configurable communication device. Following step 5004, flowchart 5000 proceeds to step 5006.

In step 5006 of the present embodiment, an inquiry determines if subscription is valid for the requested configuration (for a communication application). Step 5006 is implemented in one embodiment by using a look up table to cross reference an identification of a user, e.g., a user serial number, with their subscription details to a given communication application. A user may subscribe to a new communication application in real time in another embodiment, given the appropriate billing information. Step 5006 may include free services such as GPS or map location information in one embodiment. In another embodiment, high data rate transmissions over a wide bandwidth can command premium revenue in another embodiment. If the subscription is valid for the requested communication application, then flowchart 5000 proceeds to step 5008. However if the subscription is not valid for the requested communication application, then flowchart 5000 proceeds to step 5007.

In step 5007 of the present embodiment, a message is generated and provided to the requester for the communication application. The message can provide the failed results of the subscription, or an offer to add the subscription. Following step 5007, flowchart 5000 returns to step 5002.

In step 5008 of the present embodiment configuration information is downloaded for the requested communication application. The configuration information is limited to that required to configure the flexible portions of the function blocks required for a given communication application. Thus, in lieu of communicating configuration information for the entire profile of a communication application, the present invention only sends the configuration information that is necessary to distinguish the given communication application from the core of functionality, e.g. 82a, already provided by the function block, e.g., finger function 82, of a communication device. Configuration information can be generated apriori for a given capability of a communication device and the given communication application. Additional information on configuring of hardware resources is described in co-pending U.S. patent application Ser. No. 09/772,582 entitled "METHOD OF GENERATING A CONFIGURATION FOR A CONFIGURABLE SPREAD SPECTRUM COMMUNICATION DEVICE" by Subramanian et al.,. This related application is commonly assigned, and is hereby incorporated by reference. Following step 5008, flowchart 5000 proceeds to step 5010.

In step 5010 of the present embodiment, an identifier is transmitted that links the configuration information with an application. Step 5010 is an optional step that can be provided for several purposes. In one case, the configuration information can be archived on the receiving communication device, assuming sufficient memory. In another embodiment, multiple communication applications will be swapped intermittently on the communication device. Thus an identifier is necessary to enable its proper implementation. Step 5010 is implemented in the present embodiment by sending a signal separate from, or integrated into, the configuration information. Following step 5010, flowchart 5000 proceeds to step 5012.

In step 5012 of the present embodiment, an inquiry determines whether additional applications are desired. If additional applications are desired, then flowchart 5000 returns to step 5002. However, if additional applications are not desired, then flowchart 5000 ends.

Figure 5B:
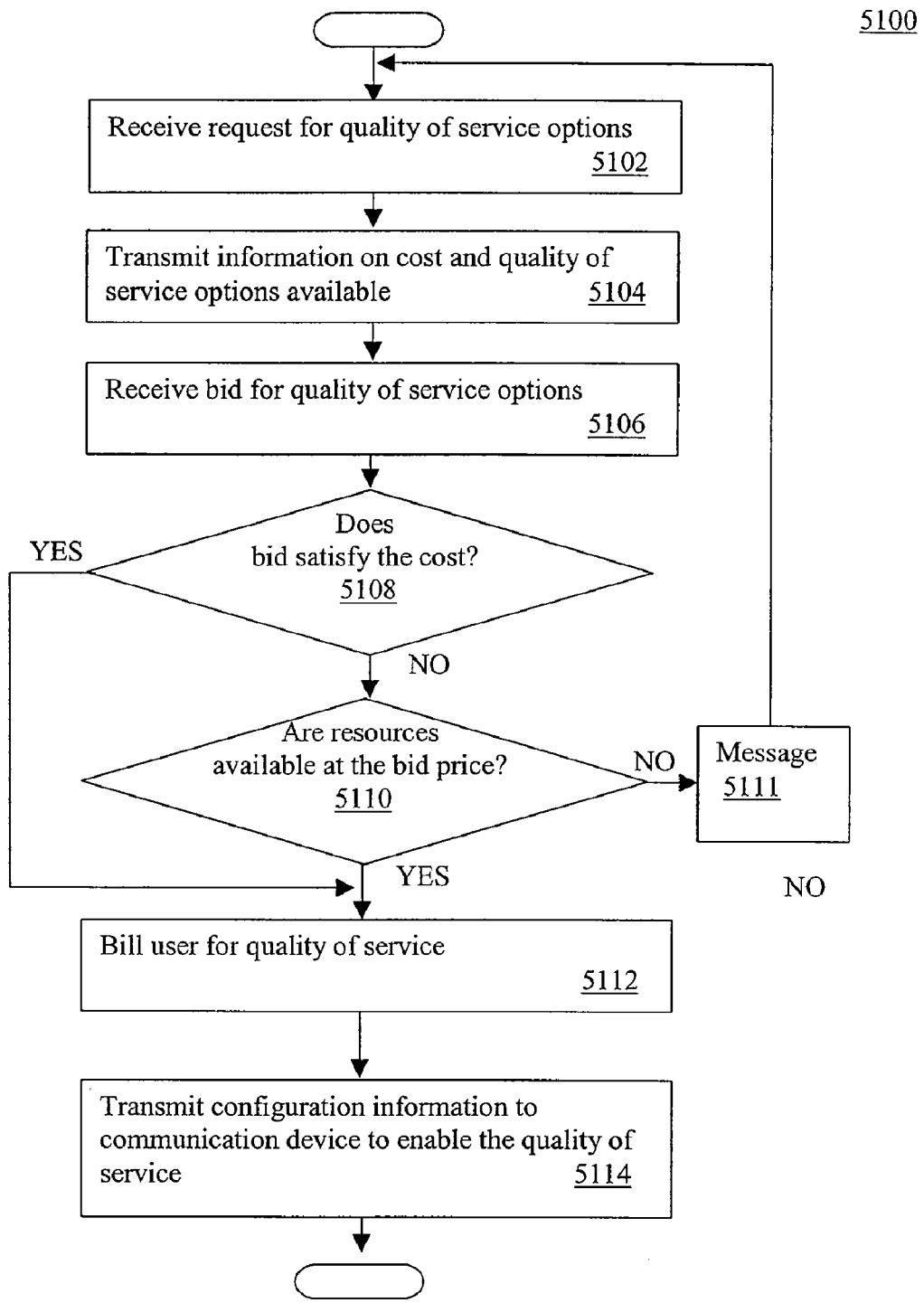
FIG. 5B is a flowchart of the process used to distribute a pool of resources among reconfigurable communication devices, in accordance with one embodiment of the present invention.

Referring now to FIG. 5B, a flowchart of the process used to distribute a pool of resources among reconfigurable communication devices, is shown, in accordance with one embodiment of the present invention. Flowchart 5100 provides one business model for accommodating limited supply of bandwidth with an excessive demand.

Flowchart 5100 begins with step 5102, wherein a request is received for quality of service options. Step 5102 is implemented in the present embodiment by receiving a request from a mobile device for a change in quality of service. The quality of service can be an increase or decrease in bandwidth. Quality of service can include features such as data rate of transmissions, e.g., enabling differing grades of still pictures or video or videoconferencing, diversity antenna transmission for better reception, or algorithmic complexity for improved performance, e.g. lower power or higher fidelity. Following step 5102, flowchart 5100 proceeds to step 5104.

In step 5104 of the present embodiment, information is transmitted on the cost and the quality of service options available. Logic is utilized in communication device 22, e.g., memory 42 and uP 44, to determine consumption of a given resource, e.g., bandwidth. If bandwidth is consumed, then the message may indicate this status. In another embodiment, the options for different bandwidth services can be with associated pricing can be transmitted. In another embodiment, advertising revenue can be utilized as an offset to the pricing associated with a given bandwidth resource. Following step 5104, flowchart 5100 proceeds to step 5106.

In step 5106 of the present embodiment, a bid is received for the quality of services. Step 5106 is accommodated in one embodiment by receiving a signal from a mobile that indicates a binary 'yes' or 'no' response. Alternatively, another embodiment will receive a price or a level of cost that the user is willing to pay of the quality of service. Following step 5106, flowchart 5100 proceeds to step 5108.

In step 5108, an inquiry determines whether the bid satisfies the cost. If the bid does satisfy the cost, then flowchart 5100 proceeds to step 5112. However, if the bid does not satisfy the cost, then flowchart 5100 proceeds to step 5110.

In step 5110 of the present embodiment, an inquiry determines whether resources are available at the bid price. Step 5110 can be implemented in one embodiment, along with steps 5106 and 5108, in a Dutch auction style. However, the present invention is well suited to any kind of preset pricing structure, bidding, or auction model.

In step 5112 of the present embodiment, the user is billed for the quality of service granted. In lieu of billing, some other form of exchange may be used of the quality of service, e.g., advertising. Following step 5112, flowchart 5100 proceeds to step 5114.

In step 5114, the configuration information necessary to implement the granted quality of service is transmitted to the communication device. Step 5114 is implemented in one embodiment in flowchart 5000. Following step 5114, flowchart 5100 ends.

While the present embodiment applies flowcharts 5000 and 5100 to a digital wireless communication system, the present invention can be applied to any electronic device for any type of application. Within the wireless communication system described in the present embodiment, the present invention is applicable to mobile units, base stations, and test platforms. Furthermore, while flowcharts 5000 and 5100 of the present embodiment show a specific sequence and quantity of steps, the present invention is suitable to alternative embodiments. For example, not all the steps provided in the aforementioned flowcharts are required for the present invention. Similarly, other steps may be omitted depending upon the application. In contrast, the present invention is well suited to incorporating additional steps to those presented, as required by an application, or as desired for permutations in the process. Lastly, the sequence of the steps for flowcharts 5000 and 5100 can be modified depending upon the application. Thus, while the present flowcharts are shown as a single serial process, they can also be implemented as a continuous or parallel process.

Many of the instructions for the steps, as well as the data input and output from the steps of flowcharts 5000 and 5100 utilize memory and processor hardware components, e.g. system memory 42 and processor 44 in FIG. 1A. The memory storage used to implement the flowchart steps in the present embodiment can either be permanent, such as read only memory (ROM), or temporary memory such as random access memory (RAM). Memory storage can also be any other type of memory storage, capable of containing program instructions, such as a hard drive, etc. Similarly, the processor used to implement the flowchart steps can either be a dedicated controller, an existing system processor, or it can be a dedicated digital signal processor (DSP), as appropriate for the type of step. Alternatively, the instructions may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "evaluating," "transmitting," "repeating," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments described herein, the present invention has been shown to overcome the limitations of a communication device with fixed data rates and fixed wireless communication standards. The present invention has also been shown to overcome the limitations of a fixed application architecture for the communication device. Beneficially, the present invention provides an architecture and a method that overcomes the limitation of a large and slow software download. Furthermore, the present invention overcomes the limitation of the narrow scope of changes capable from a software download to a DSP. The present invention also overcomes the limitation of providing resources, and the configurations to use them, to users simply on a first come first serve basis.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, the thereby enable others skilled in the art to best utilize the invention and various embodiments with various modifications as are suited to the particular use contemplated. It is intended that the scope of the invention be defined by the following claims and their equivalents.

We claim:

1. A method of configuring a wireless communication device of a cellular communication network, the wireless communication device comprising an RF subsystem, the method comprising:

digitizing an output signal of the RF subsystem;

routing the digitized signal to a reconfigurable baseband processor;

directing an output of the reconfigurable baseband processor to a parameter estimation processor, said parameter estimation processor performing inner receiver functions on the output which can be called via software routines from an instruction set processor; and directing an output of the parameter estimation processor to a digital signal processor or a microprocessor.

2. The method recited in claim 1 wherein the digitizing step is performed by a free-miming analog-to-digital converter.

3. The method recited in claim 1 wherein the routing step includes placing the digitized signal on a bus.

4. The method recited in claim 1 wherein the reconfigurable baseband processor is implemented with a combination of fixed function logic and programmable logic.

5. The method recited in claim 1 wherein the performing step is implemented using multi-rate digital signal processing techniques, software-programmable filter coefficients, rate-conversion, channelization, and loop filter parameters.

6. The method recited in claim 1 wherein the output signal of the reconfigurable baseband processor is a complex IQ signal.

7. The method recited in claim 1 wherein the digital signal processor and the microprocessor are software programmable.

8. The method recited in claim 1 further comprising performing channel selection, sample-rate conversion, digital down-conversion, and digital filtering on the signal by the reconfigurable baseband processor.

* * * * *